Oct. 4, 1949.   F. SWINEHART   2,483,677
MOISTUREPROOF PIEZOELECTRIC CRYSTAL
AND METHOD OF MAKING SAME

Filed June 24, 1946   3 Sheets-Sheet 1

INVENTOR.
FRANK SWINEHART
BY
ATTORNEY

Oct. 4, 1949.                F. SWINEHART                    2,483,677
                  MOISTUREPROOF PIEZOELECTRIC CRYSTAL
                       AND METHOD OF MAKING SAME
Filed June 24, 1946                                    3 Sheets-Sheet 3
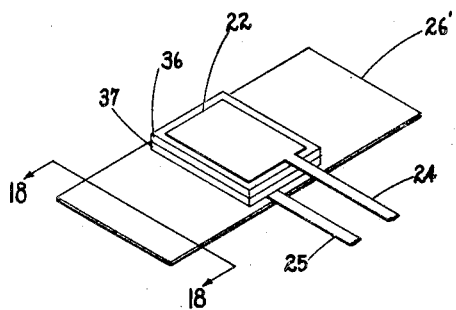
FIG. 17
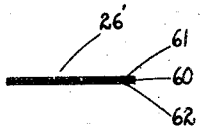
FIG. 18
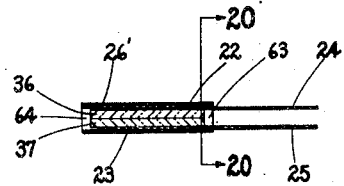
FIG. 19
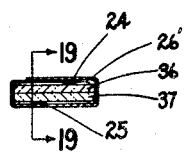
FIG. 20
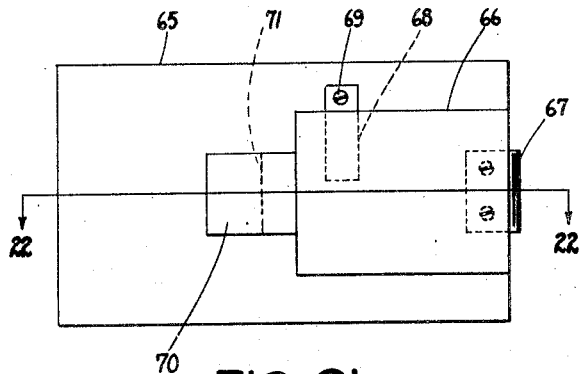
FIG. 21
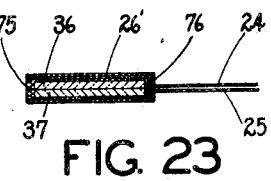
FIG. 23
FIG. 22
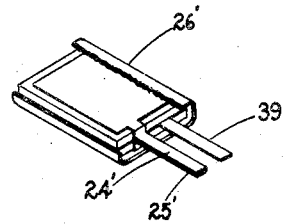
FIG. 24
*INVENTOR.*
FRANK SWINEHART
BY
*Elmer J. Hyde*
ATTORNEY Patented Oct. 4, 1949

2,483,677

UNITED STATES PATENT OFFICE 2,483,677

MOISTUREPROOF PIEZOELECTRIC CRYSTAL AND METHOD OF MAKING SAME

Frank Swinehart, Strongsville, Ohio, assignor to The Brush Development Company, Cleveland, Ohio, a corporation of Ohio Application June 24, 1946, Serial No. 678,713

13 Claims. (Cl. 171—327)

My invention pertains to piezoelectric crystals and more particularly to a moistureproof piezoelectric crystal element and methods of moistureproofing the same.

This application is a continuation-in-part of my previous application Serial Number 520,520, filed January 31, 1944 and now abandoned.

Two very undesirable results may occur when a piezoelectric crystal unit becomes moist. The first is that certain types of crystalline materials such as Rochelle salt will rapidly dissolve in small amounts of moisture. The second is that if crystalline material such as Rochelle salt, primary ammonium phosphate, or the like, which has been formed into a piezoelectric unit having leads and electrodes gets moist on the faces between the electrodes the moisture will conduct current and very materially reduce the effectiveness of the unit.

This surface moisture, whether the crystalline material is water soluble or not, may establish a shunt path between the electrodes, and this path may conduct electrical current, and if a voltage is impressed between the electrodes of the element, the heat generated in this path might ruin the crystal. Further, if the unit is used as a generator, then the shorting effect of the leakage path will reduce the low frequency response of the system.

Heretofore, numerous means and methods have been proposed for rendering piezoelectric units less sensitive to moisture. One of them has been to dip the crystal plate, after the electrodes and leads have been put on, into a lacquer or shellac or wax compound in order to provide a thin film of moistureproofing material over the entire surface of the unit.

It has been found that practically all moistureproofing materials shrink somewhat upon drying and thereby cause the moistureproof coating to be thin at the edges and corners of the crystal plate. In time, moisture will penetrate the thin part of the coating and establish a moist path between the electrodes, which path conducts current and materially reduces the effectiveness of the unit; and after sufficient moisture has penetrated the coating large amounts of crystalline material, which if it is of Rochelle salt or other water soluble material, are dissolved away and the unit becomes inoperative.

An object of my invention is to provide moistureproofing means for a piezoelectric unit.

Another object of my invention is to provide a piezoelectric unit which may be dipped into, sprayed, or otherwise coated with waterproofing material and which will prevent thin portions from forming in the coating at the edges and corners of the crystal plate.

A further object of my invention is to provide a method of more effectively moistureproofing a piezoelectric unit.

It is another object of my invention to provide a piezoelectric unit having a moistureproof coating which is of full-thickness at the edges and corners of the piezoelectric plate.

Other objects and a fuller understanding of my invention may be had by referring to the following description and claims taken in conjunction with the drawings, in which:

Figure 17 is an isometric view of another form of my invention.

Figure 18 is a sectional view, taken along line 18—18 of Figure 17, and showing the details of a portion of the element shown in Figure 17.

Figure 19 is a sectional view taken along line 19—19 of Figure 20, and Figure 20 is a sectional view taken along line 20—20 of Figure 19, showing the details of this other form of my invention.

Figures 21 and 22 are plan and sectional side views respectively of a device used in the fabrication of an element in accordance with my invention.

Figure 23 is a sectional side view of a series-connected element, after the device shown in Figures 21 and 22 has operated on it, and Figure 24 shows by a partially broken-away isometric view a parallel-connected element which has been partially fabricated in accordance with my invention.

Figure 1:
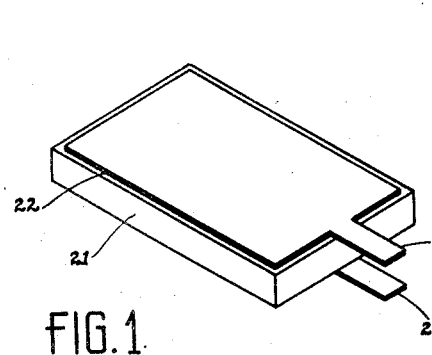
Figure 1 is an isometric view of a crystalline plate having electrodes and leads.

With reference to Figure 1 there is shown a plate 21 of piezoelectric crystalline material such as Rochelle salt, primary ammonium phosphate, or the like, which has the disadvantage that upon becoming moist certain effects take place which materially reduce the effectiveness of a piezoelectric unit made from that plate. If sufficient moisture or water is on the surface of the piezoelectric plate and the plate is soluble in water, the crystalline material will dissolve in that moisture. Further, if electrodes, such as electrodes 22 and 23 (not shown in Figure 1), and leads 24, 25 are connected to the plate 21 and the unit is used as a generator device, that is, mechanical stresses are applied to the plate and a voltage is realized between the leads 24, 25, a certain amount of current will leak over the moist crystal faces between the top electrode 22 and a bottom electrode 23 (shown in Figure 3) thereby reducing the output between leads 24, 25. If the unit is used as a motor device an alternating voltage will be applied between leads 24, 25 and the unit will vibrate in accordance with that voltage. However, if there is moisture on the edge faces of the unit between the electrodes there will be established current conductive paths of relatively low resistance between leads 24 and 25, and the effective voltage in many cases between the electrodes will be materially lessened. These current conductive paths may be established whether the crystalline material is soluble or not. In some motor devices, whether the crystalline material is soluble or not, a conductive path across its surface will generate heat sufficient to cause an electrical breakdown of the unit.

Figure 2:
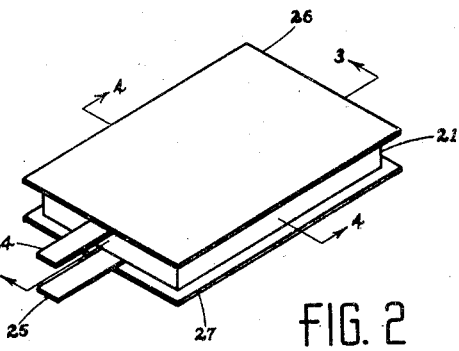
Figure 2 is an isometric view of the crystalline plate after the next step in the method of moistureproofing the unit.

Figure 2 shows the first step in moistureproofing my new piezoelectric unit. To the unit shown in Figure 1, I apply a top cover sheet of material 26 and a bottom cover sheet of material 27. These sheets extend substantially entirely over the major faces of the plate 21 and a little bit beyond each edge which may be defined as a junction between two faces. These sheets 26 and 27 are preferably of a moisture-resistant material such as Vinylite, Pliofilm, waxed paper, metallic foil, or the like, but do not necessarily have to be moistureproof as paper is also usable. These sheets 26, 27 may extend about 1/32 of an inch beyond each edge of the plate 21 and are affixed to the plate 21 and its electrodes by means of glue or shellac, or the like. After sheets 26, 27 have been applied the unit is coated with a moistureproofing material by spraying, dipping, painting, etc. In one convenient method it is clipped onto an endless chain by means of spring clips engaging the leads 24, 25 and the unit is dipped into a bath of moistureproofing material. For a more detailed description of the dipping process reference may be made to C. K. Gravley's Patent Number 2,359,476. After the unit has been removed from the bath and dried, there is formed a substantially moistureproof coating entirely around the unit.

Figure 3:
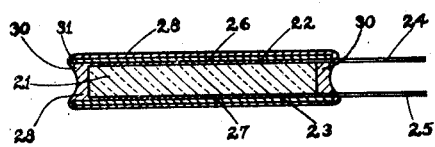
Figure 3 is a sectional view taken along line 3—3 of Figure 2.
Figure 4:
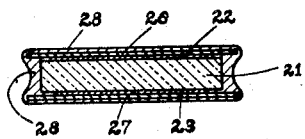
Figure 4 is a sectional view taken along line 4—4 of Figure 2.

Figure 3 illustrates the coated piezoelectric unit and shows the top electrode 22, and top lead 24, the bottom electrode 23 and the bottom lead 25. Extending across the top major face of the piezoelectric plate 21 is the cover sheet 26 and extending across the bottom major face is the cover sheet 27. The moistureproof coating is identified by reference character 28 and is in the form of a thin film across the surface of the sheets 26, 27 and has established fillets 30 of the material between the portions of the sheets 26, 27 which extend beyond the edges of the plate 21 and the edge faces of the plate. It is to be noted at the corners such as at 31 that the coating of moistureproof material is materially thinner than at any other place. This is because the material will not cover as well around the corners and edges and it is at these locations in prior art devices where moisture penetrated the coating and substantially immediately came in contact with the crystalline material to render the unit inoperative. By applying the cover sheets 26, 27, I have, in effect, moved the thin portion of the moistureproof film away from the piezoelectric unit and away from the electrodes. In my device moisture will penetrate the thin portion 31 of the film but after it has penetrated to the sheets 26 or 27 it is not effective to render the unit inoperative until it has penetrated through the sheet to the plate 21. For this reason, the unit made in accordance with my invention will withstand being surrounded by moisture for a much longer period of time than a standard piezoelectric unit. In one test in which new units waterproofed in accordance with my invention were compared to units waterproofed in accordance with prior art methods and not having sheets 26 or 27, the new units operated about twenty-two and one-half times as long as the standard prior units.

Figure 5:
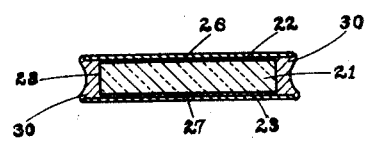
Figure 5 is a sectional view somewhat similar to Figure 4 showing the coated crystalline plate after a portion of the coating material has been removed.

Figure 5 is a cross-sectional view of the piezoelectric plate 21 with its associated electrodes 22, 23 and cover sheets 26, 27 after the unit has been dipped in a moistureproofing material 28, which in this instance may be a wax or paraffin, and after the moistureproof coating material has been scraped from the outside faces of the top and bottom cover sheets. Fillets 30 of moistureproof material are thereby left around the edge faces of the plate and the "critical corner portions" are effectively moved away from the corner of the crystal plate. It is sometimes desirable to remove the wax from the major faces in order to provide more uniform thickness for the clamping of one end of the unit as is almost always done when the unit is built into a device such as a microphone or a phonograph pickup. In this instance when the waterproofing material is removed from the faces, the sheets 26, 27 should be made of a moistureproof material.

Figure 6:
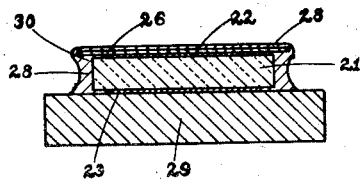
Figure 6 is a sectional view of a modified form of my invention.

Figure 6 illustrates another form of my invention in which the crystal plate 21 is mounted upon a base 29 with the electrode 23 therebetween, and the moistureproof material 28 is applied to the device. The base 29 takes the place of the bottom sheet 27 insofar as forming the desired fillets 30 is concerned.

Figure 7:
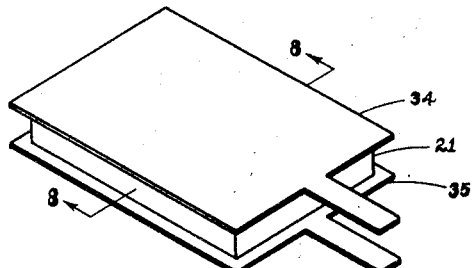
Figure 7 is an isometric view of another modified form of my invention.
Figure 8:
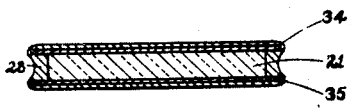
Figure 8 is a sectional view taken through line 8—8 of Figure 7.

Figures 7 and 8 show a modified form of my invention in which the functions of the electrode 22 and the cover sheet 26 are embodied in the electrode 34 which extends beyond the edge faces of the plate 21, and in which the functions of the electrode 23 and the cover sheet 27 are embodied in the electrode 35 which also extends beyond the edge faces of the unit. After the plate 21 has been electroded in a manner illustrated in Figure 7 it is dipped in or sprayed or painted with a moistureproof material so as to form fillets and to provide a full-thickness moistureproof coating at the edges and corners of the plate as has been previously described. This is shown in Figure 8 which is a sectional view taken along line 8—8 of Figure 7 after the device illustrated in Figure 7 has been coated with moistureproofing material.

Figure 9:
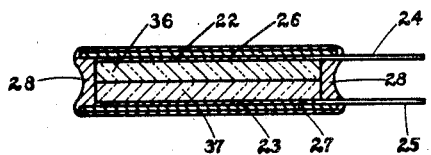
Figure 9 is a sectional view of a series-connected multiplate flexing piezoelectric unit.

Figure 9 illustrates my invention as applied to a multiplate piezoelectric unit which is series connected.

In this unit there are two plates of piezoelectric material 36, 37 connected together with a certain orientation which is well known in the art. A top electrode 22 and a bottom electrode 23 are applied as in the previously described devices, and the top cover sheet 26, the bottom cover sheet 27 and the moistureproof material 28 are applied as in the previously described manner.

Figure 10:
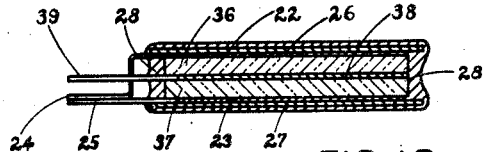
Figure 10 is a sectional view of a parallel-connected multiplate flexing piezoelectric unit.

Figure 10 illustrates my invention as applied to a parallel-connected multiplate unit which has a center electrode 38 and center lead 39. The two outside electrodes 22, 23 are connected together by their leads 24, 25, top and bottom cover sheets 26, 27 and the moistureproof coating 28 are similar to the previously described series-connected unit of Figure 9.

Figure 11:
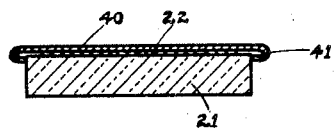
Figure 11 is a sectional view of a modified form of my invention in which the cover sheet has rounded edges.

Figure 11 illustrates another type of cover sheet 40 for covering a face of the piezoelectric unit. As is illustrated at 31 in Figure 3, the moistureproof coating will be thin where it rounds a sharp corner. This is due to shrinkage of the coating material as it dries, and to the sharp edge of the sheets 26, 27 cutting through the coating as the coating shrinks. In the manufacture of the piezoelectric plates it is possible to bevel or round the sharp edges thereby reducing the danger of the corners of the crystal plate protruding through the waterproof coating. However, it is a long, tedious, uneconomical procedure as it involves a lot of hand and machine work with piezoelectric plates some of which may be quite small. Furthermore, these machine operations are apt to break the crystal plates. In accordance with the invention shown in Figure 11, I make the cover sheet 40 of a material such as Viscoloid, Vinylite, wax paper, metallic foil, etc., and provide it with a downwardly turned edge portion 41 for establishing a rounded corner which will not cut through the thin coating of moistureproof material as the material shrinks.

When a crystal unit which has a cover sheet with turned edge portions is dipped in moistureproof material and allowed to dry, the hard coating which is formed will have substantially its full thickness around the edge of the unit.

Figure 12:
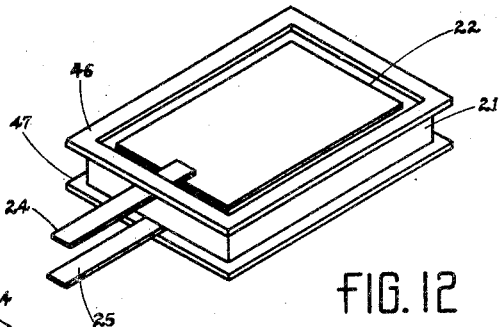
Figure 12 is an isometric view of still another form of my invention in which the cover sheet is in the form of an edge mask.

Figure 12 shows a modified form of my invention in which hollow masks 46, 47 are utilized, and which extend beyond the edges of the crystal plate material for the same reasons that the cover sheets 26, 27 extend beyond the edges of the plate. As in the previous figures waterproofing material is then added to establish a moistureproof unit.

Figure 13:
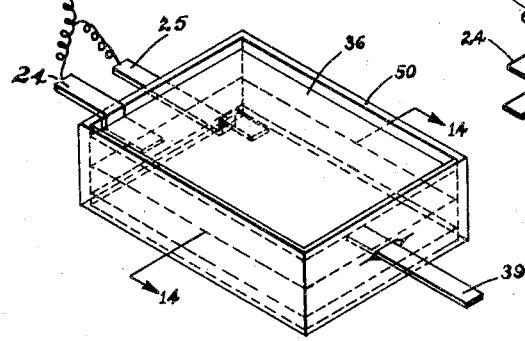
Figure 13 is an isometric view of a form of my invention in which the cover sheet is applied to the edge faces of the crystal unit.

Figure 31 illustrates a form of my invention in which sheet means 50 is applied around the edge faces of the piezoelectric plates rather than to the major faces where the electrodes are positioned. The unit illustrated is a parallel-connected multiplate assembly similar to that shown in Figure 10, and the lead 39 is brought out through a small slit in the sheet material 50, and the lead 24 is brought out over the extending edge of the sheet 50. The lead 25 which contacts the outside major face of the other crystal plate (not shown) is brought out in a manner similar to the lead 24 and may then engage lead 24 as is shown in Figure 10. For a unit such as is shown in Figure 13, the sheet material 50 should be made of an electrical non-conductor if it is to be placed directly against the edge faces of the piezoelectric unit. If, however, insulating means are provided between the piezoelectric plates 36, 37 and the sheet means 50, then the sheet means 50 may be made of an electrically conductive material.

Figure 14:
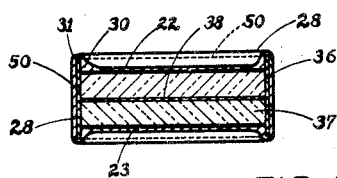
Figure 14 is a sectional view taken along lines 14—14 of Figure 13.

Figure 14 is a cross-sectional view taken through Figure 13 after the unit had been dipped in moistureproofing material and shows how the fillets 30 of moistureproof material are built up at critical points, and also shows how the thin portion 31 is established sufficiently far away from any critical point on the piezoelectric plates that even though moisture does penetrate, it is not effective to materially adversely affect the operation of the unit.

When the lead 39 is brought out through the edge sheet material 50, as in Figure 13, it is apt to break off if it is bent too many times. In order to reduce the danger of the lead 39 breaking off at or near the crystal unit and in order to increase the length of the signal leakage path I provide a lead guard 43 comprised, for example, of a top portion 44 and a bottom portion 45. Each portion 44, 45 is bent to establish a base portion 48 which rests against the edge surfaces of the crystal plates 36, and a portion which extends through the sheet material 50 in the direction of the free end of the lead 39. The extending portions are preferably wider than the lead 39 and may be connected together around the lead. A convenient construction is to utilize a plastic or some other material which softens upon being heated, and to "heat-weld" the edges of the top and bottom portions 43, 44 together around the lead 39. The ends of the lead-guard 43 which extend outwardly from the crystal plates may be slightly flexible thereby to reduce the fatigue stresses which may be present in the lead 39 if the lead is flexed too much during assembly into a piezoelectric device. Use of the lead-guard 43 also increases the leakage path between the lead 39 and the top and bottom electrodes which are on the top and bottom major faces of the crystal plates.

Although I have shown the base portions 48 of the lead-guard 43 underneath the edge sheet 50, it is to be understood that it might also be mounted on the outside surface of the edge sheet by means of glue or other such attaching means. A subsequent step in the production of a waterproof unit is to coat it with some waterproofing material, and after this material dried it would firmly connect the lead-guard 43 in place.

Figure 16:
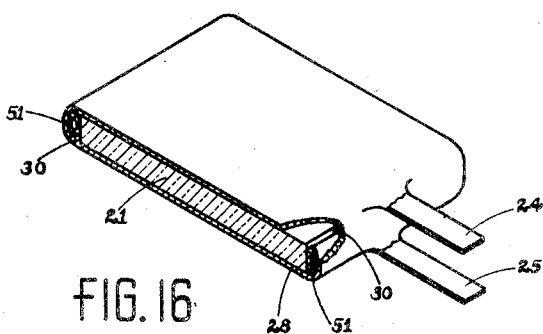
Figure 16 is an isometric view partially in section of a modified form of my invention in which a rounded band is applied to the edge faces of the crystal unit.
Figure 15:
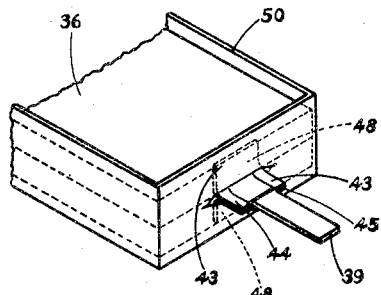
Figure 15 is an isometric view of an end portion of the device of Figure 13, showing a lead protecting device.

Figure 16 illustrates a form of my invention, for convenience shown on a single plate but which can be readily applied to multiplate assemblies, in which a hollow Vinylite tube or a rubber band 51 is stretched around the edge of the unit prior to the unit being dipped in moistureproofing material, and is caused or allowed to shrink about the crystal plate. Due to the presence of this hollow rubber tube 51, fillets 30 of moistureproofing material will be built up between the tube 51 and the plate 21 and a full thickness of moistureproof coating material will be obtained at the edges and corners of the crystal whereby moisture is much less liable to penetrate through the coating 28 to the faces of the plate 21 where it would cause damage.

Figures 17 to 24 illustrate still another form of my invention.

In Figure 17 there is shown a series-connected multiplate flexing piezoelectric crystal unit or element comprised of suitable oriented and connected crystal plates 36 and 37, electrode 22, and leads 24, 25. It is to be understood that there is a center electrode between the crystal plates 36, 37, and that there is an electrode on the bottom face of the element to which the lead 25 is connected, similar to the electrode 22 and lead 24. As is well known in the art the lead may be integral with the electrode, or it may be a separate piece of conducting material in electrical contact with the electrode.

In order to moistureproof the element a length of "Metalam" 26' which is just a little bit wider than the length of the crystal element is provided, and the top surface of the "Metalam" is covered with a thin layer of a suitable adhesive such as "Bakelite" cement. The crystal element is then positioned on the "Metalam" with the length dimension thereof aligned with the width dimension of the "Metalam", as is shown in Figure 17, and with a little bit of the "Metalam" extending out beyond the top and bottom edges of the crystal plates. The "Metalam" is then wrapped about the crystal element with its end portions in overlapping relationship, as is shown in Figures 19 and 20.

"Metalam" is a trade name for a thin layer of metallic foil, such as aluminum, to each side of which has been bonded by suitable adhesive material a thin layer of a plastic material such as "Vitafilm" or other suitable material. Any moisture-resistant "Vinylite" or other similar material is also suitable, and other foils such as tin foil are suitable. Figure 18 illustrates such a moistureproofing wrapper comprised of a central layer 60 preferably about .001 inch thick metal foil covered on both sides by a .0015 inch thick layer of plastic material. While I show and specifically describe as the preferred form of my invention a foil wrapper both of whose faces are covered with a plastic layer, it is to be understood that it is possible to practice my invention utilizing a wrapper which is uncoated, or one which has on one face coated.

The wrapping of the crystal element in a wrapper 26' which extends beyond the ends of the crystal plates forms two long, narrow cup-shaped receptacles, one identified by the reference character 63 at the top or lead end and the other 64 at the bottom end of the element.

The wrapped element is then placed on the base plate 65 of a device shown in Figures 21 and 22 which is utilized to center the leads 24, 25. The device consists of the base plate 65 to which a top plate 66 is connected by means of the hinge 67. A spring 68 is connected to the base plate 65 by screw 69 and it lies between the base plate and the top plate 66 urging the top plate away from the base plate. The end of the top plate which is opposite the hinge 67 is provided with a laterally extending finger 70 spaced above the top surface of the base plate 65 to form a small cavity 71 therebetween, and the edge of the finger is sharpened slightly. The distance from the top surface of the base 65 to the finger 70 is such that as the wrapped crystal element is slid laterally toward the finger 70 the upper lead 24 is caught underneath the finger and is folded down to a central position, as is shown in Figure 22. The crystal element is then taken out and turned over, the process then being repeated with the lead 25. This results in both leads being folded into a position substantially centrally located with respect to the thickness dimension of the crystal. The leads 24, 25 will not touch each other, however, as they are off-set laterally as is shown in Figures 17 and 20.

After the leads 24, 25 have been bent into a central position the end cups 63, 64 are filled with a suitable moisture-resistant material, such as wax or the like. This is easily done using a heated metal eye dropper, the heat keeping the wax from becoming hard in the dropper and assuring that the wax is in a sufficiently fluid condition that it will flow readily. The end of the dropper is placed in one of the cups 63 or 64 and a drop or two of the wax squeezed out of it. Being in a fluid condition it readily flows to the ends of the cup and quickly hardens forming wax fillets 75, 76.

Figure 24 illustrates my invention utilized with a parallel-connected multiplate flexing crystal unit wherein the lead 39 extends outwardly from the inner electrode which is between the two crystal plates, and the leads 24', 25' are electrically connected together and engage or are integral with the outside electrodes. The lead positioning jig may be used to center the leads but usually for parallel-connected units this is not necessary as the leads, especially lead 39, are well centered during the fabrication of the unit. The crystal unit is then wrapped in a wrapper 26', as has been described, and the ends are filled with wax or other such hardenable material, as has been described in detail with reference to the series-connected element.

With respect to the drawings, it is to be realized that in order to adequately illustrate the subject matter it has been necessary to exaggerate the thickness dimensions of the crystal plates and the various wrappers and covers. A typical crystal of the multiplate type may be on the order of thirty thousandths of an inch in thickness, and the wrapper on the order of one to three thousandths of an inch in thickness. The thicker wrapper changes the characteristics of the crystal element somewhat but good design of the crystal element will usually substantially compensate for this change, and usually the much more effective moistureproofing realized by my invention more than makes up for any detrimental effects which cannot be compensated.

Although I have described my invention with a certain degree of particularity, it is obvious that many other means for achieving the same or substantially the same desired results may be utilized, and that other methods for making the new unit may be employed without departing from the spirit and scope of my invention.

I claim as my invention:

1. A plate of piezoelectric material having two major faces and an edge face therebetween, sheet means connected to at least one of said major faces and extending beyond said edge face substantially throughout the length of said edge face, and a fillet of moistureproofing material against said edge face and against the extending portion of said sheet means in the angle therebetween.

2. A plate of piezoelectric material having two major faces and an edge face therebetween, first sheet means connected to one of said major faces and second sheet means connected to the other of said major faces, said first and second sheet means extending beyond said edge face substantially throughout the length of said edge face, and a fillet of moistureproofing material against said edge face and between the extending portions of said first and second sheet means.

3. The invention as set forth in claim 1, further characterized in this: that said sheet means is comprised of moisture-resistant material.

4. The invention as set forth in claim 1, further characterized in this: that said sheet means is comprised of moisture-resistant material and it covers the said major face.

5. In a piezoelectric crystal element having electrode means and lead means extending from said electrode means beyond an edge face thereof, wrapper means extending around said element, said wrapper means extending beyond at least one edge face thereof establishing a cup-shaped receptacle whose bottom is the said edge face of said crystal element beyond which the element leads extend whereby said lead means extend outwardly from the bottom of said cup-shaped receptacle beyond the edge of said wrapper means, and a fillet of moisture-resistant material in said cup-shaped receptacle for sealing the lead end of said crystal element against the ingress of moisture.

6. The invention as set forth in claim 5, further characterized in this: that said wrapper is comprised of moisture-resistant metallic foil and a layer of electrically non-conducting moisture-resistant material on at least one face thereof, said non-conducting layer being positioned between said metallic foil and said crystal element.

7. The invention as set forth in claim 5, further characterized in this: that said wrapper means extends beyond two edge faces of said crystal element whereby two cup-shaped receptacles are formed, one at the top edge thereof where said lead means extend out from the said electrode means and the other at the opposite crystal edge face, and a fillet of moisture-resistant material in each of said cup-shaped receptacles.

8. In a piezoelectric crystal unit, a plate of piezoelectric crystalline material having a pair of major faces, electrode means on said plate, lead means connected to said electrode means, means other than said lead means extending parallel and closely adjacent to at least one of said pair of major faces and connected thereto and extending beyond at least one of the edges of said plate, and moisture-resistant means covering said edge face of said piezoelectric plate and at least a portion of said means which extends beyond the edge thereof.

9. In a piezoelectric crystal unit, a plate of piezoelectric crystalline material having a pair of major faces, means covering and connected to said pair of major faces and extending beyond at least one of the edges substantially throughout the length thereof, and moisture-resistant means covering other portions of said piezoelectric plate and said means which extends beyond the edge thereof.

10. In a piezoelectric crystal unit, a plate of piezoelectric crystalline material having a plurality of faces, electrically non-conductive means extending parallel and closely adjacent to at least one of the major faces of said plate and extending beyond substantially all of the edges thereof, and moisture-resistant material covering the edge faces of said piezoelectric plate forming a fillet between said edge faces and said means which extends beyond the edge thereof.

11. In a piezoelectric crystal unit, a plate of piezoelectric crystalline material having a plurality of faces, means extending parallel and closely adjacent to at least one of said faces of said plate and extending beyond at least one of the edges substantially throughout the length thereof, and moisture-resistant material covering said piezoelectric plate and said means which extends beyond the edge thereof.

12. In a piezoelectric crystal unit, a plate of piezoelectric crystalline material having a plurality of faces, means extending parallel and closely adjacent to at least one of the said faces of said plate and extending beyond at least one edge substantially throughout the length of said edge, and a moisture-resistant coating covering a portion of said piezoelectric plate and a portion of said means which extends beyond the edge thereof including a fillet of the moisture-resistant coating material between the edge of the plate and the end of the extension of said means lying beyond the said edge.

13. In a piezoelectric crystal unit, a plate of piezoelectric crystalline material having a plurality of faces, first sheet means extending in a plane parallel and closely adjacent to one of the said faces of said plate and extending beyond at least one edge substantially throughout the length of said edge, second sheet means extending in a plane parallel to the plane of said one face and closely adjacent to one other of the said faces of said plate and extending beyond at least one edge substantially throughout the length of said edge, and moisture-resistant coating material covering a portion of said piezoelectric plate not covered by said sheet means and said sheet means which extend beyond the edges thereof including fillet means of the moisture-resistant coating material between the edges of the plate and the ends of the extension of said sheet means beyond the said edges.

FRANK SWINEHART.

REFERENCES CITED

The following references are of record in the file of this patent:

UNITED STATES PATENTS

| Number | Name | Date |
| --- | --- | --- |
| 1,766,042 | Nicolson | June 24, 1930 |
| 1,776,009 | Rieber | Sept. 16, 1930 |
| 1,812,977 | Ohl | July 7, 1931 |
| 1,975,516 | Nicolson | Oct. 2, 1934 |
| 2,106,143 | Williams | Jan. 18, 1938 |
| 2,266,768 | Kornei | Dec. 23, 1941 |
| 2,324,024 | Ream | July 13, 1943 |
| 2,402,531 | Christian | June 25, 1946 |